(12) United States Patent
Jebai et al.

(10) Patent No.: US 11,811,343 B2
(45) Date of Patent: Nov. 7, 2023

(54) MAGNETIC FLUX ESTIMATE

(71) Applicant: Schneider Toshiba Inverter Europe SAS, Pacy sur Eure (FR)

(72) Inventors: Al Kassem Jebai, Vernon (FR); Thomas Devos, Carrières sous Poissy (FR); François Malrait, Jouy sur Eure (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 0 days.

(21) Appl. No.: 17/458,731

(22) Filed: Aug. 27, 2021

(65) Prior Publication Data
US 2022/0077801 A1    Mar. 10, 2022

(30) Foreign Application Priority Data

Sep. 4, 2020   (EP) .................................... 20305981

(51) Int. Cl.
*H02P 23/14*        (2006.01)

(52) U.S. Cl.
CPC .......... *H02P 23/14* (2013.01); *H02P 2207/05* (2013.01)

(58) Field of Classification Search
CPC ........ H02P 23/14; H02P 2207/05; H02P 1/46; H02P 25/022; H02P 25/024; H02P 25/03; H02P 27/045; H02P 27/047; H02P 27/048; H02P 27/16; H02P 1/04; H02P 21/14; H02P 21/08; H02P 21/13; H02P 27/085; H02K 21/18
See application file for complete search history.

(56) References Cited

U.S. PATENT DOCUMENTS

| 2017/0155349 | A1  | 6/2017 | Kim et al. |
| 2017/0179859 | A1* | 6/2017 | West ...................... H02P 21/141 |
| 2018/0019700 | A1* | 1/2018 | Suzuki ...................... G01K 7/16 |

OTHER PUBLICATIONS

European Search Report and Written Opinion dated Feb. 19, 2021 for corresponding European Patent Application No. EP20305981.1-1202, 8 pages.

* cited by examiner

*Primary Examiner* — Muhammad S Islam
*Assistant Examiner* — Bradley R Brown
(74) *Attorney, Agent, or Firm* — Locke Lord LLP

(57) ABSTRACT

Examples include a method for controlling a synchronous motor using a variable speed drive. The motor includes a permanent magnet rotor generating a magnetic flux. The method includes applying a predefined electrical command signal to the motor and estimating a motor speed in response to the applying of the predefined electrical command signal. The method also includes reaching a desired estimated motor speed and, in response to reaching the desired estimated motor speed, estimating a parameter related to the magnetic flux of the permanent magnet rotor. The method further includes recording the estimated parameter.

13 Claims, 7 Drawing Sheets

MAGNETIC FLUX ESTIMATE

FIELD OF THE INVENTION

This invention relates to a method for controlling a synchronous motor using a variable speed drive, and to a variable speed drive for implementing said method.

BACKGROUND

In a conventional variable speed drive of a synchronous electrical motor comprising a permanent magnet, in particular a permanent magnet comprised in a rotor of the synchronous motor to produce a magnetic flux, a control law is executed by a processing unit and receives an input reference. As a function of such input reference and of measurements of values on the motor, the processing unit determines a voltage reference to be applied to the electrical motor. From this voltage reference, the processing unit determines the control voltages to be applied to each output phase connected to the motor. These voltages are applied to the motor using an electronic power architecture.

As a general rule, the control law takes the magnetic flux of the permanent magnet into account. Such magnetic flux may be provided by a manufacturer of the synchronous motor. Such magnetic flux may be input as an element of the control law. Sometimes, the magnetic flux is not known, in the case of an old motor for example. The magnetic flux value provided may however not precisely correspond to the effective magnetic flux value of the specific permanent magnet concerned, or may be input incorrectly in the control law, for example using incorrect units. Controlling a synchronous motor using a control law taking into account a magnetic flux which does not correspond to the effective magnetic flux can severely impact motor performance, or even prevent operating the synchronous motor.

The aim of the invention is therefore to propose a method for controlling a synchronous motor using a variable speed drive, the motor comprising a permanent magnet rotor generating a magnetic flux, the method permitting avoiding issues introduced by lack of precision or mistakes in magnetic flux value.

SUMMARY

The invention is defined by the appended independent claims. Additional features and advantages of the concepts herein disclosed are set forth in the description which follows.

The present disclosure describes a method for controlling a synchronous motor using a variable speed drive, the motor comprising a permanent magnet rotor generating a magnetic flux, the method comprising:
applying a predefined electrical command signal to the motor;
estimating a motor speed in response to the applying of the predefined electrical command signal;
reaching a desired estimated motor speed;
in response to reaching the desired estimated motor speed, estimating a parameter related to the magnetic flux of the permanent magnet rotor; and
recording the estimated parameter.

Such a method permits recording an estimated parameter related to the magnetic flux of the permanent rotor, thereby permitting operating the motor more precisely than using a magnetic flux value for the permanent rotor which may be inaccurate, or determining that such magnetic flux does not correspond to an expected value.

Optionally, the estimating of the motor speed comprises monitoring motor currents. The motor currents will indeed reflect an effective rotation speed of the motor.

Optionally, the predefined electrical command signal is a predefined voltage signal. Using a predefined voltage signal will indeed permit synchronizing the motor to the command when operating in a stable mode.

Optionally, the parameter is the magnetic flux of the permanent magnet rotor. This permits estimating the magnetic flux of the permanent magnet rotor of the motor directly.

Optionally, reaching the desired estimated motor speed results from adapting a value of the predefined electrical command signal iteratively. Proceeding by iteration of the predefined electrical command signal permits reaching a stable mode of operation of the motor progressively.

Optionally, estimating the parameter related to the magnetic flux of the permanent magnet rotor results from adapting a value of the parameter iteratively. Proceeding by iteration permits experimentally deducing a value for the estimated parameter.

Optionally, the desired estimated motor speed is within a reference speed range or above a reference speed threshold. Using such a desired estimated motor speed permits detecting that the motor is operating in a stable mode.

Optionally, reaching the desired motor speed comprises comparing an estimated motor speed to an expected motor speed. Using such a desired estimated motor speed permits detecting that the motor is operating as expected.

Optionally, when reaching the desired motor speed comprises comparing an estimated motor speed to an expected motor speed, the desired motor speed is reached when a difference between the estimated motor speed and the expected motor speed starts decreasing or is less than a speed difference threshold. Using such a change in tendency as a trigger permits gaining time in proceeding with the method according to this description by precisely detecting when the motor enters into a stable operating mode, catching up with the command.

Optionally, the estimated parameter is within a reference parameter range. This permits introducing a desired degree of precision in estimating such estimated parameter, thereby avoiding unnecessarily lengthening a time to obtain such estimate.

Optionally, the predefined electrical command signal has a predefined amplitude and frequency profile. Such predefined amplitude and frequency profile may be chosen to increase the likelihood that the motor reaches a stable mode of operation rapidly.

Optionally, the method comprises taking the recorded estimated parameter into account for driving the synchronous motor. This permits leveraging the method according to this disclosure to drive the synchronous motor, and do so precisely.

Optionally, the method further comprising providing a magnetic flux state diagnostic based on a deviation of the estimated parameter from a predetermined range. Identifying such a deviation may permit identifying undesired behaviors or situations.

The present disclosure also describes a computer-readable storage medium comprising instructions which, when executed by a processor, cause the processor to carry out any of the methods hereby described. Such processor may for example be a processor of a variable speed drive of the synchronous motor comprising the permanent magnet rotor.

The present disclosure also describes a variable speed drive of a synchronous motor comprising a permanent magnet rotor, the variable speed drive comprising a processor and a memory, the processor being configured to operate according to any of the methods hereby described. Such variable speed drive may thereby operate or control the motor with increased precision.

DETAILED DESCRIPTION

Figures 1, 2:
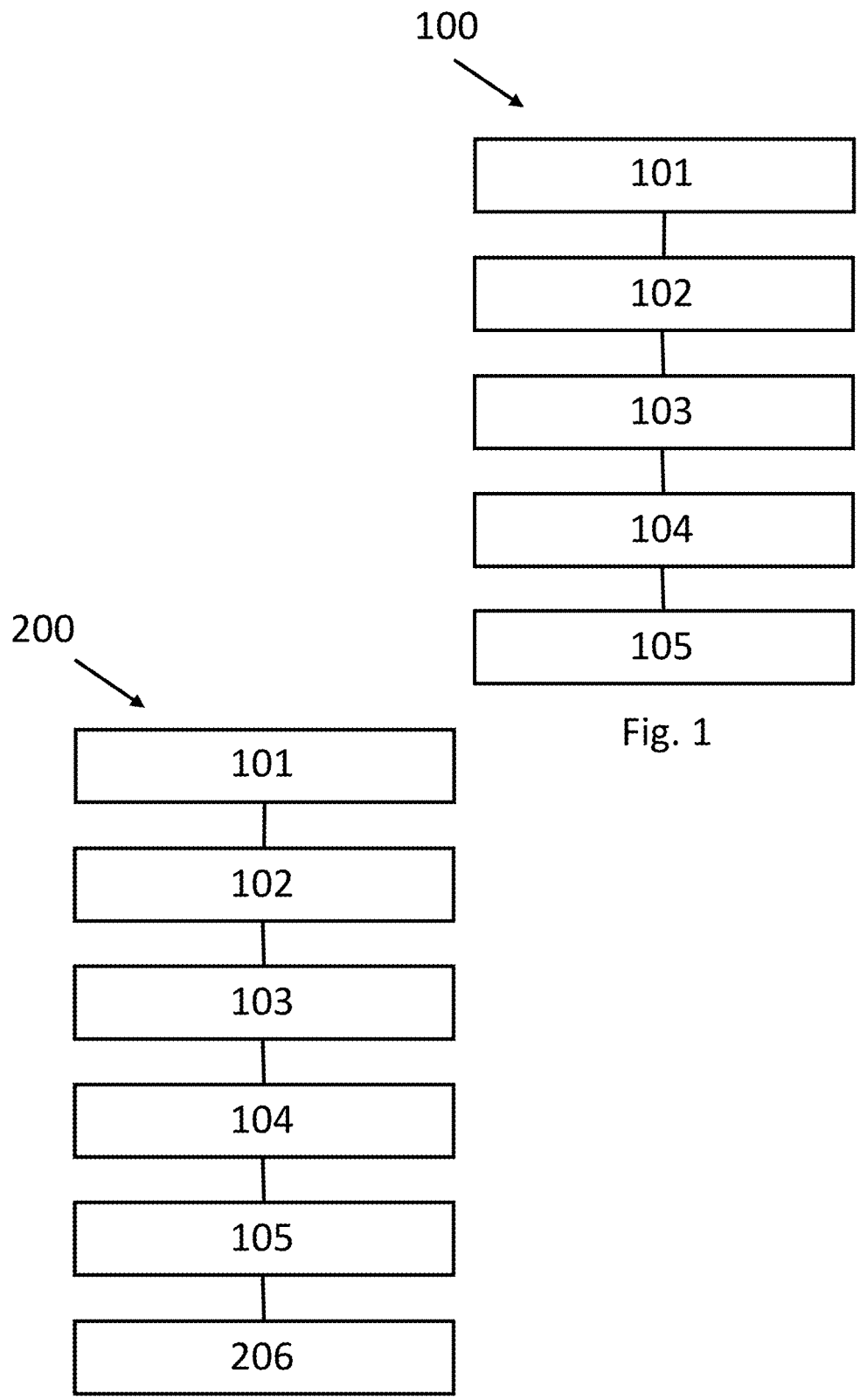
FIG. 1 illustrates an example method.
FIG. 2 illustrates another example method.

This disclosure applies to the controlling of synchronous motor using a variable speed drive. A variable speed drive should be understood in this disclosure as an electronic, virtual or software implemented control unit for an electric motor. In some examples, a variable speed drive comprises a processing and control unit intended to implement a control law by taking into account, for example, an input speed set point, voltages to be applied to the electric motor during normal operation of the motor and control instructions to be applied to an inverter stage in order to obtain these output voltages. The control law may be of a vector or a scalar type. The variable speed drive may comprise a rectifier stage at an input, such rectifier stage being intended to convert an alternating voltage supplied by an electric network into a direct voltage. The variable speed drive may also comprise a direct power bus connected, on the one hand, to the rectifier stage and, on the other hand, to an inverter stage. The direct power bus can comprise two power lines connected together by at least one bus capacitor configured to stabilize the voltage of the bus. The rectifier may be of a passive type such as a diode bridge or an active type based on controlled transistors. The inverter stage may be connected at the output of the direct power bus and intended to cut off the voltage supplied by the bus at a variable voltage to the electric motor; the inverter stage comprising for example multiple switching arms each comprising controlled power transistors, for example of the IGBT type, for applying the variable voltage to the electric motor. The inverter may be controlled by, for example, a conventional technique using a PWM (Pulse Width Modulation) or Vector Control type. The control law performed by the processing unit UC makes it possible to determine the voltage to be applied to the output phases intended to be connected to the motor to be controlled.

According to this disclosure, a synchronous motor is controlled by the variable speed drive. A synchronous motor should be understood as an alternating-current (AC) electric motor designed to run at a speed which varies with the frequency of a power source applied to a stator of the motor. Starting a synchronous motor may be challenging and a synchronous motor starting procedure may be implemented in a control law applied by the variable speed drive of the synchronous motor to start. In the synchronous motors according to this disclosure, the motor speed is maintained or obtained by a permanent magnet rotor of the motor which will tend to revolve at the same speed as a magnetic field generated by the power source applied to stator windings. In other words, in a stable state of operation, the rotor rotates at the same speed as a revolving field generated by the stator. In some examples, the stator comprises a cylindrical frame with windings, such as three phase windings for example, located in slots of the stator. During stable operation, as a mechanical load is applied, the rotor slips back a number of degrees with respect to a rotating field of the stator, developing torque and continuing to be drawn around by this rotating field. The angle between a magnetic field of the rotor and a magnetic field of the stator normally increases as load increases. According to this disclosure, the magnetic field for the rotor of the synchronous motor is provided by using one or more permanent magnets, whereby the motor comprises a permanent magnet rotor generating a magnetic flux. The rotor may also comprise one or more windings in addition to the one or more permanent magnets, such as a damper winding for example. The use of permanent magnets may eliminate or reduce the use of slip rings and of an external power source dedicated to generating a rotor magnetic field. While a magnetic flux value generated by windings may be evaluated as a function of the power applied to the windings, the magnetic flux value produced by one or more permanent magnets is a function of each permanent magnet, and may in principle not be evaluated in a simple manner. Such magnetic flux value should however be taken into account as a factor in a control law aimed at driving the motor. In some cases, such magnetic flux value is provided by a manufacturer of the motor, for example on a visible plaque displaying motor characteristics or on a motor data sheet. A user of the motor may then use such manufacturer provided magnetic flux value as a factor of the control law used to operate the motor. A user may however enter such value inaccurately, for example using inaccurate magnetic flux units. Even if such value is entered correctly by a user, such value may not correspond to the effective magnetic flux value for the specific motor concerned, because the manufacturer may for example provide an average magnetic flux value for a plurality of similar but different motors. The magnetic flux value may also evolve over time, the material of the permanent magnet being submitted to external influences such as temperature and external magnetic field which may impact an original magnetic flux value and modify it. Such inaccuracies have a negative impact on controlling the motor. The methods hereby described reduce or prevent such negative impact.

FIG. 1 illustrates an example method 100 according to this disclosure. As illustrated in bloc 101, method 100 comprises applying a predefined electrical command signal to the motor. The applying of the predefined electrical command signal may take place by applying a corresponding power to stator windings of the motor. In some examples, the motor is at rest prior to proceeding with bloc 101. The predefined electrical command signal is predefined in that the electrical command is defined by the variable speed drive. In other words, such predefined electrical command signal is an output of the variable speed drive and an input to the motor. In some examples, the predefined electrical command signal is a predefined voltage signal. In some examples, the predefined electrical command signal is an alternative-current signal having a predefined frequency and amplitude. The predefined frequency and amplitude may vary over time in a predefined manner. The predefined electrical command signal may be adapted to starting the motor from a resting position. The predefined electrical command signal may be a function of a provided magnetic flux value for the rotor, for example a magnetic flux value provided by a technical data plate on the motor. In some examples, the predefined electrical command signal is non stationary and changes over time. In some examples, the predefined electrical command signal has a predefined amplitude and frequency profile.

As illustrated in bloc 102, method 100 comprises estimating a motor speed in response to the applying of the predefined electrical command signal. An estimated motor speed should be understood as an estimate of a motor speed resulting from the application of the predefined electrical command signal. As the predefined electrical command signal may vary over time, so may vary the estimated motor speed. As mentioned above, starting a synchronous motor from a resting position may be challenging, so that an estimated motor speed may, at the start of the method according to this disclosure, be lower than a desired motor speed, the desired motor speed corresponding for example to a frequency of the power source applied to the stator winding. The estimating of the motor speed may take place using a number of different possibilities, including for example the use of sensors or encoders placed on a motor shaft. In some examples, the motor speed is estimated from the motor voltage and current at stator windings using a speed observer such as a simple speed observer or a position observer. In some examples the speed observer takes motor parameters, motor currents and motor tensions into account to determine motor speed based on a dynamic motor model. In some examples, the estimating of the motor speed comprises comparing the current frequency with a frequency of the predefined voltage signal, whereby a frequency of the predefined voltage signal may correspond to a desired motor speed, and the current frequency to an effective motor speed, such motor speeds differing for example due to the motor starting from a resting position.

As illustrated in bloc 103, method 100 comprises reaching a desired estimated motor speed. Completing bloc 103 ensures that the motor is effectively in movement and in stable operation, the rotor following the magnetic field generated by the stator in function of the load. The desired estimated motor speed is a non zero motor speed. The magnetic flux of the permanent magnet rotor may be estimated due to the motor operating at such non zero speed, the motor generating a back EMF (electromotive force) which will permit evaluating the magnetic flux according to this disclosure. Without wishing to be bound by theory, controlling the motor using an accurate value of the magnet flux permits stable control of the synchronous motor. In fact, when a synchronous motor is running, the motor generates a back EMF voltage proportional to the motor speed and depending on permanent magnet flux. The variable speed drive may adapt the voltage applied to the motor to take into account the level of the back EMF voltage generated by the motor, a deviation in the applied voltage by the variable speed drive compared to the back EMF voltage leading to poor motor control performances and potentially up to loss of motor control stability. According to the method according to this disclosure, the motor should rotate in order to generate a voltage back EMF in order to, in turn, estimate the magnetic flux. If the motor is not running, regardless of the applied predefined electrical command signal, the back EMF voltage would be zero and the magnetic flux of the permanent magnet rotor may not be estimated according to the present method. In some examples, reaching the desired estimated motor speed results from adapting a value of the predefined electrical command signal iteratively, the predefined electrical command signal being for example adapted in a later phase based on the estimating of the motor speed in a previous phase. In some examples, the desired estimated motor speed is within a reference speed range or above a reference speed threshold. In some examples, a reference speed range is within 0.5% of a reference speed. In some examples, a reference speed corresponds to a specific speed between 10 Hz and 1000 Hz. The reference speed may correspond to the frequency of a voltage applied to stator windings by the predefined electrical command signal according to this disclosure. The desired estimated motor speed may be close to the reference speed without being equal to such reference speed. An objective is to ensure that the motor started and is operating in a stable manner, even if an effective motor angle does not exactly correspond to a reference angle, for example due to the load, or to a mis-adjustment as to the provided magnetic flux value. In some examples, reaching the desired motor speed comprises comparing an estimated motor speed to an expected motor speed. In some examples, the expected motor speed is equal to the reference speed and corresponds to a voltage frequency of the predetermined electrical command signal. In some examples, the desired motor speed is reached when a difference between the estimated motor speed and the expected motor speed starts decreasing or is less than a speed difference threshold. When starting a synchronous motor, effective motor speed would be zero when the motor is at rest. A predetermined electrical command signal may also start at zero frequency, and progressively increase voltage frequency over time. In some examples, the difference between effective motor speed, corresponding to the estimated motor speed, and the expected motor speed, corresponding for example to the voltage frequency of the predetermined electrical command signal, will progressively increase in a first phase, and progressively decrease in a second phase, the point of inflexion between the first and second phase corresponding to the start of stable operation, the rotor starting to catch up with the filed generated by the rotor. This inflexion point is a point at which the magnetic flux of the permanent magnet rotor may start being estimated.

As illustrated in bloc 104, method 100 comprises, in response to reaching the desired estimated motor speed, estimating a parameter related to the magnetic flux of the permanent magnet rotor. As explained above, it is important to note that bloc 104 is in response to bloc 103 being completed. It is important that the desired estimated motor speed be reached, ensuring stable motor operation, in order to proceed with bloc 104 of estimating the parameter related to the magnetic flux of the permanent magnet motor. While in some examples the parameter is the magnetic flux of the permanent magnet rotor, the parameter may be a parameter related to the magnetic flux, and permitting to indirectly obtain the magnetic flux value. In some examples, estimating the parameter related to the magnetic flux of the permanent magnet rotor results from adapting a value of the parameter iteratively. In such iterative cases, the predetermined electrical command signal may be set by a control law of the variable speed drive using a first parameter value, the estimated motor speed may be compared to an expected motor speed, and another second parameter value may be used based on the comparison and on the first parameter value, progressively setting parameter values until the effective behavior of the motor corresponds to the expected behavior, in which case the parameter corresponds to the estimated parameter which, as illustrated in bloc 105, may be recorded. In some examples, the estimated parameter is within a reference parameter range, for example when successive iterations as part of the estimating change the parameter value by less than 0.2%, thereby corresponding to a convergence in the iteration. Such use of a parameter range permits reducing a time leading to the identification of the magnetic flux as per the methods hereby described.

An example method 200 according to this disclosure is illustrated in FIG. 2. Method 200 comprises blocs 101-105 in line with blocs 101-105 as described in FIG. 1. Method 200 further comprises bloc 206 of taking the recorded estimated parameter into account for driving the synchronous motor, thereby benefitting from using in a control law applied by the variable speed drive a magnetic flux value corresponding to an effective magnetic flux value estimated according to methods hereby described. This permits to use the method according to this disclosure not only for diagnostic purposes, but also for improving the precision of operation of the respective electric motor, whereby a control law taking the estimated parameter into account may proceed with control of the motor with an increased precision.

Figures 3, 4:
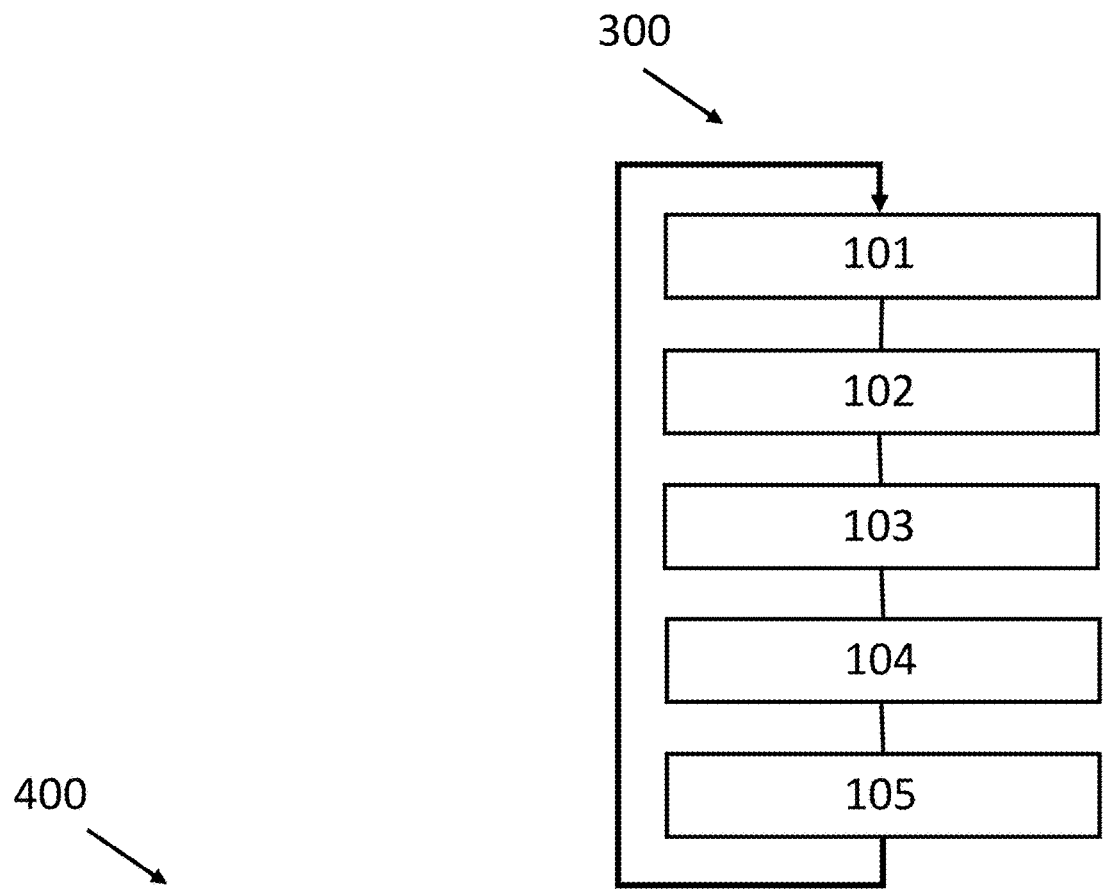
FIG. 3 illustrates a further example method.
FIG. 4 illustrates yet another example method.

An example method 300 according to this disclosure is illustrated in FIG. 3. Method 300 comprises blocs 101-105 in line with blocs 101-105 as described in FIG. 1. Method 300 further comprises repeating the method according to FIG. 1 periodically. Such period may be for example set by a user. Example period may be one of once a day, once a month or once a year. Such period may be set following a time of use of the electric motor. Such period may be set following a specific schedule adapted to a specific motor type, for example by shortening the period as an electric motor ages. Such period may be set remotely, for example by an electric motor or variable speed drive manufacturer.

An example method 400 according to this disclosure is illustrated in FIG. 4. Method 400 comprises blocs 101-105 in line with blocs 101-105 as described in FIG. 1. Method 400 further comprises bloc 407 of starting the electric motor from a resting position, such start being followed by applying, at each start of the variable speed drive, the method 100. This may permit ensuring that the electric motor is driven using updated parameters according to this disclosure.

Figures 5, 6:
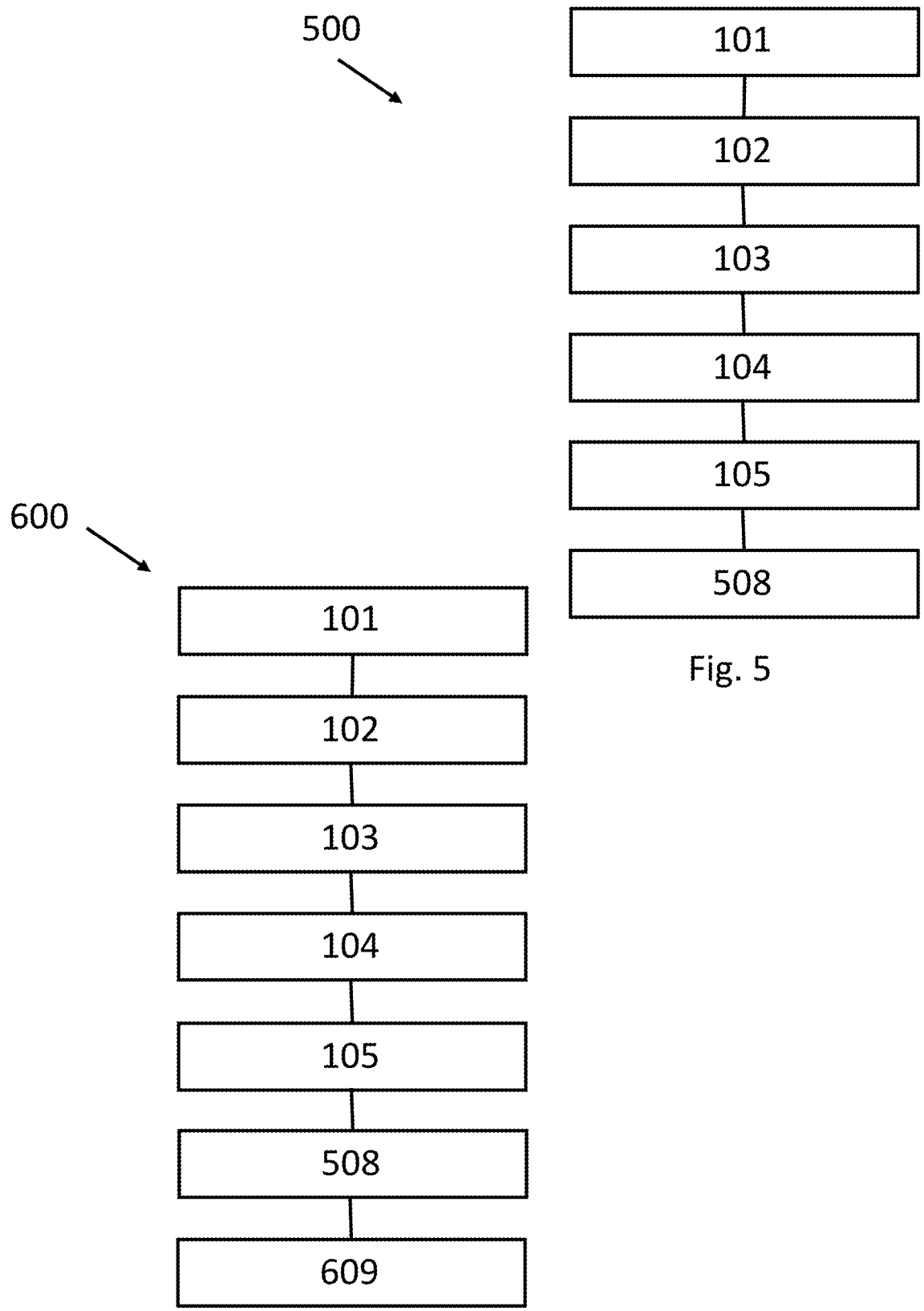
FIG. 5 illustrates yet a further example method.
FIG. 6 illustrates an additional example method.

An example method 500 according to this disclosure is illustrated in FIG. 5. Method 500 comprises blocs 101-105 in line with blocs 101-105 as described in FIG. 1. Method 500 further comprises bloc 508 of recording an evolution of one or more torque estimated parameters over time. Such evolution record may be for example stored in a memory of the variable speed drive according to this disclosure. Such evolution record may also, or alternatively, be stored remotely. Such evolution record may be stored on a centralized data depository, such centralized data depository storing evolution records corresponding to a plurality of variable speed drives, thereby permitting comparing an evolution of such variable speed drives and corresponding electric motors. Such centralized data depository may be maintained by a manufacturer of the electric motor or of the variable speed drive in order to monitor the plurality of variable speed drives and electric motors, thereby permitting implementing preventive measures if a certain evolution is detected for a certain type of variable speed drive or electric motor.

An example method 600 according to this disclosure is illustrated in FIG. 6. Method 600 comprises blocs 101-105 in line with blocs 101-105 as described in FIG. 1. Method 600 comprises bloc 508 in line with bloc 508 as described in FIG. 5. Method 600 further comprises bloc 609 of providing a magnetic flux state diagnostic based on a deviation of the estimated parameter from a predetermined range. Such providing of diagnostic may permit preventing or solving issues which otherwise would negatively impact the operation of the electric motor and/or of the variable speed drive. Life expectancy of an electric motor or variable speed drive may indeed be rendered longer by applying a method according to this disclosure.

Figure 7:
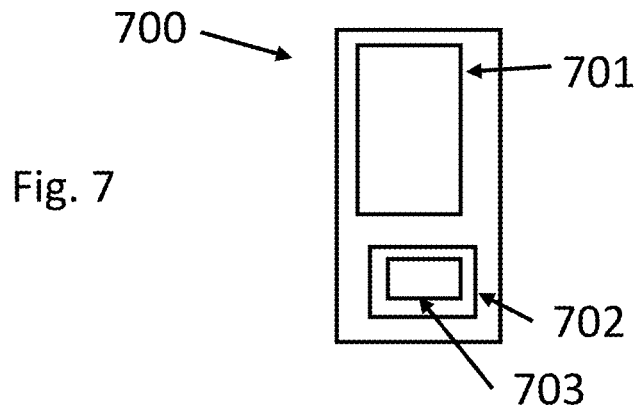
FIG. 7 illustrates an example variable speed drive.

FIG. 7 illustrates an example variable speed drive 700 comprising a processor 701, the processor 701 being configured to operate according to any of the methods hereby described. Processor 701 may comprise electronic circuits for computation managed by an operating system.

FIG. 7 also illustrates a non-transitory machine-readable or computer readable storage medium, such as, for example, memory or storage unit 702, whereby the non-transitory machine-readable storage medium is encoded with instructions 703 executable by a processor such as processor 701, the machine-readable storage medium comprising instructions 703 to operate processor 701 to perform as per any of the example methods hereby described.

A computer readable storage according to this disclosure may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like. As described hereby, the computer readable storage may be encoded with executable instructions according to the methods hereby described.

Storage or memory may include any electronic, magnetic, optical or other physical storage device that stores executable instructions as described hereby.

Figure 8:
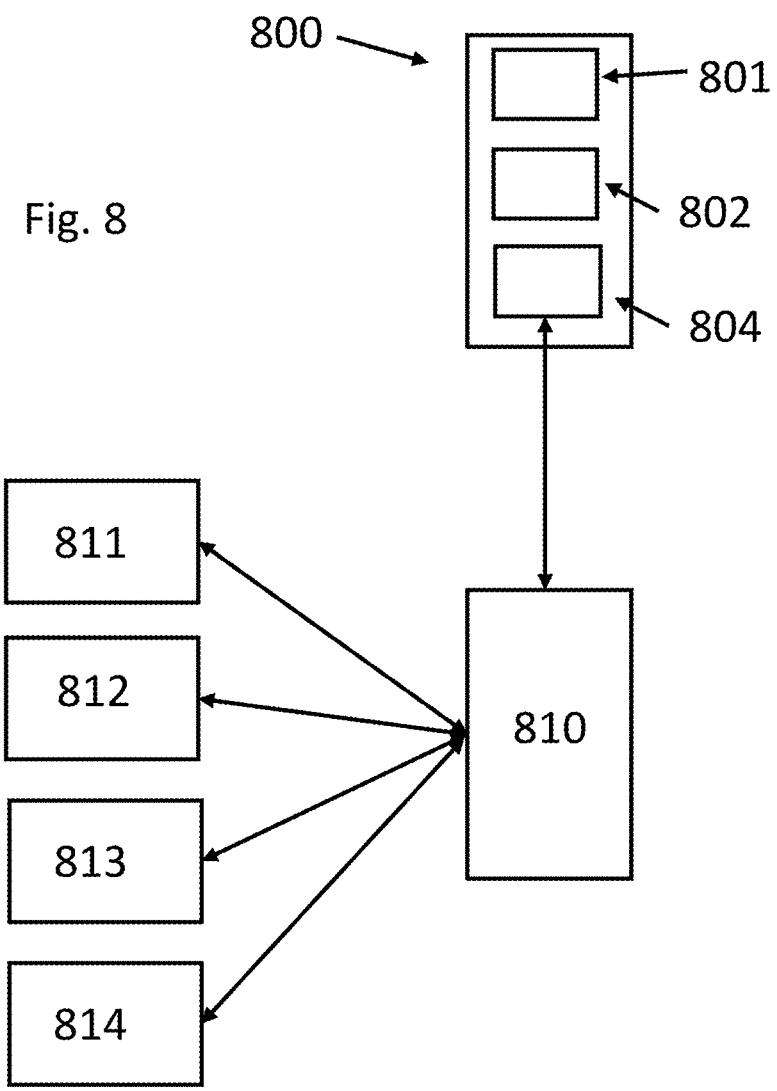
FIG. 8 illustrates another example variable speed drive.

FIG. 8 illustrates an example variable speed drive 800 comprising a processor 801, a memory 802, the processor 801 being configured to operate according to any of the methods hereby described. Processor 801 may comprise electronic circuits for computation managed by an operating system. Variable speed drive 800 further comprises a networking module 804. Networking module 804 permits transmitting data related to the estimated parameter according to this disclosure to a centralized data depository 810. Centralized depository 810 may in turn be connected to a plurality of variable speed drives 811-814 according to this disclosure. Such centralized depository may collect estimated parameters according to this disclosure in a memory of the centralized depository, the centralized depository processing such collected estimated parameters using a processing unit or processor of the centralized depository in order to monitor the plurality of variable speed drive connected or networked to the centralized depository.

Figure 9A:
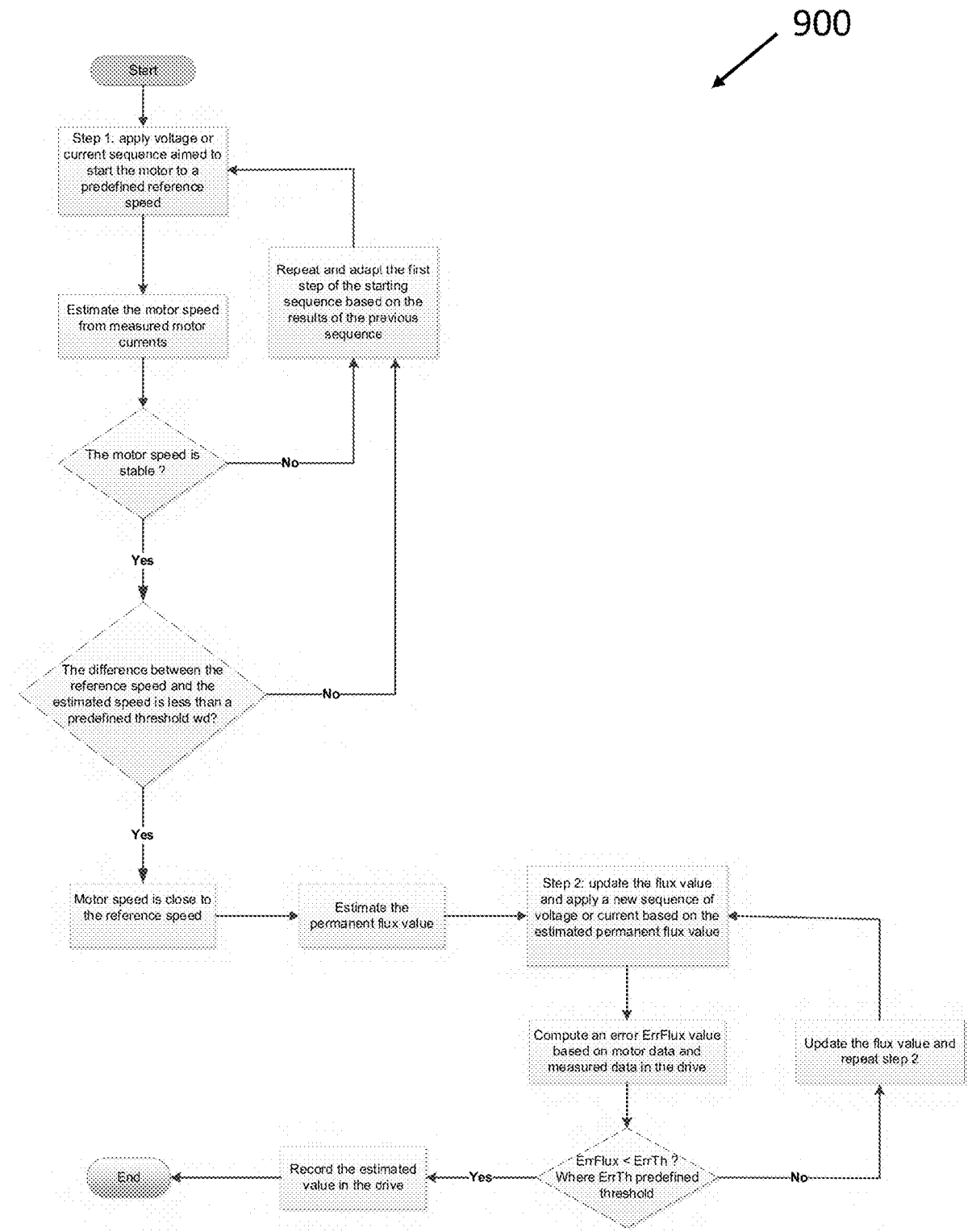
FIGS. 9A-C illustrate a further additional example method.

FIG. 9A illustrates a specific example method 900 according to this disclosure. In a first step, the method comprises applying a voltage or current sequence aimed to start the motor to a predefined reference speed, whereby the voltage or current sequence corresponds to the predetermined electrical command signal and the predefined reference speed corresponds to the desired estimated motor speed according to this disclosure. This step is followed by estimating the motor speed from measured currents, thereby estimating a motor speed in response to the applying of the predefined electrical command signal. If the motor speed is stable, in other words if the desired estimated motor speed has been reached, the process moves to a following phase which will be described below. If the motor speed is not stable, meaning that the desired estimated motor speed was not reached, the first step is repeated iteratively, repeating and adapting the first step of the starting sequence based on the results of the previous sequence. In other words, reaching the desired estimated motor speed results from adapting a value of the predefined electrical command signal iteratively.

Figure 9B:
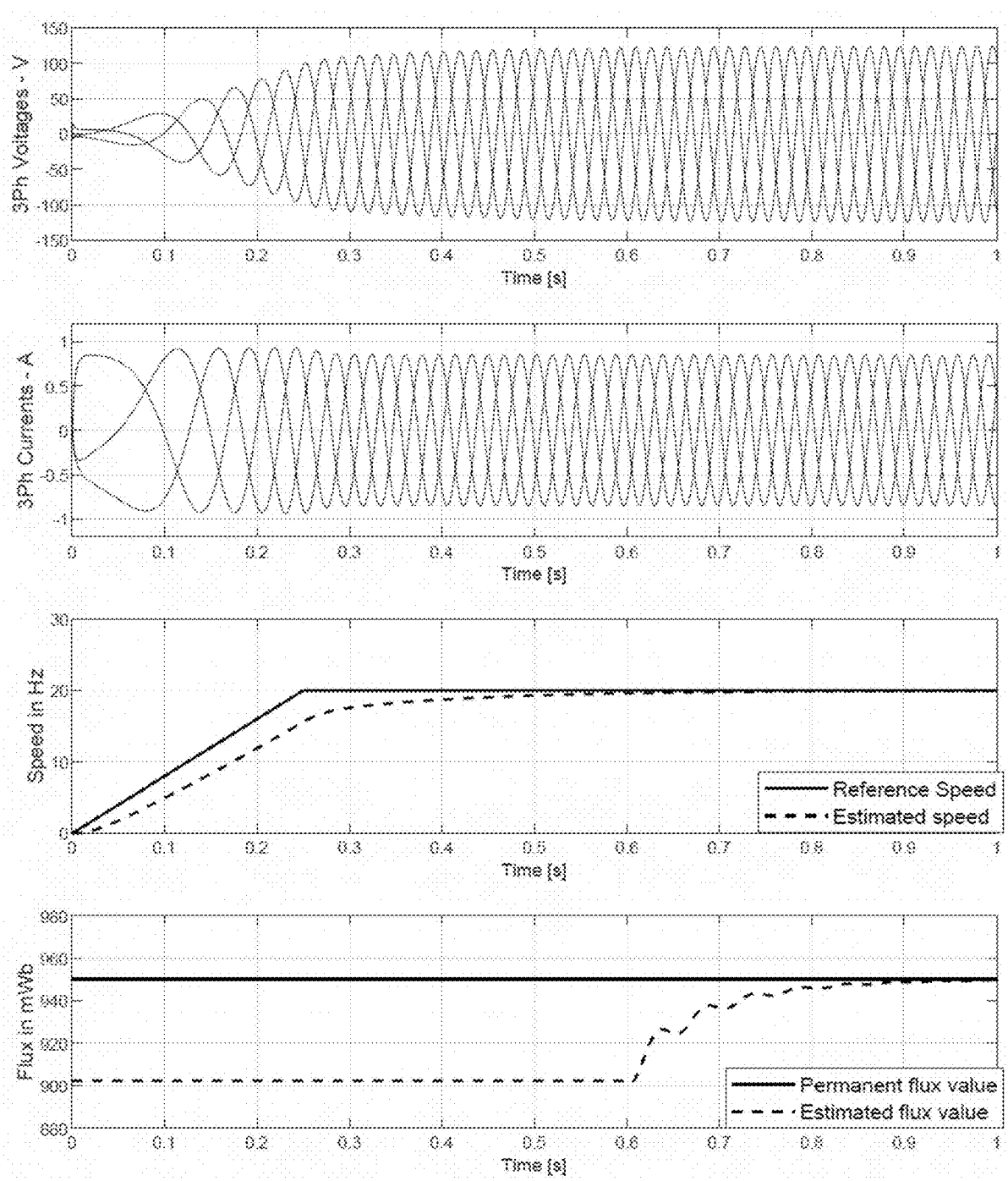
Figure 9C:
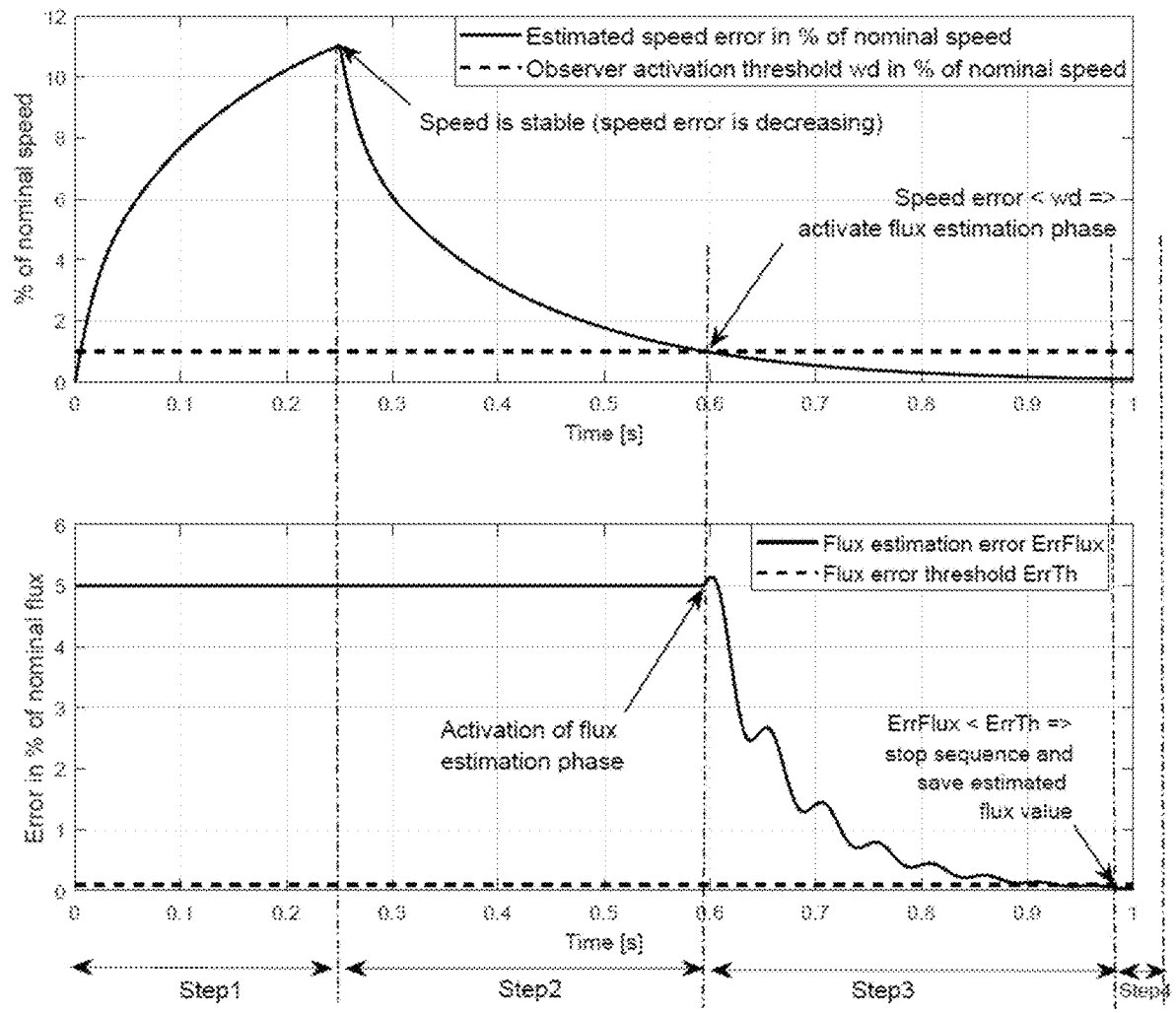

The method 900 illustrated in FIG. 9A corresponds to the graphs of FIGS. 9B and 9C. The graphs of FIGS. 9B and 9C illustrate the evolution of a number of variables during the process of method 900 taking place, the time being in second. The complete method illustrated here lasts 1 second. During the first 0.25 second, the motor speed is not stable. Indeed, during the first 0.25 seconds, as illustrated in the first two graphs of FIG. 9B, the measured currents "3Ph Currents—A" corresponding to three phase currents measures in the motor windings are lagging compared to the "3Ph Voltages—V" corresponding to the predefined electrical command signal, which progressively increases in voltage amplitude and voltage frequency during a predetermined motor starting sequence. During this same phase of the first 0.25 seconds, and as illustrated in the third graph of FIG. 9B, the estimated speed, corresponding to the frequency of the currents measured in the second graph of FIG. 9B, differs significantly from the reference speed. The difference between the estimated speed and the reference speed is illustrated in percent of nominal speed in the first graph of FIG. 9C. This graph illustrates how the tendency changes at 0.25 seconds, the estimated speed starting to catch up with the reference speed. This is the point at which the speed is considered stable.

When the motor speed is stable, the following phase may start by checking if the difference between the reference speed and the estimated speed is less than a predetermined threshold wd. This phase lasts in method 900 from time 0.25 s to time 0.6 s. During this following phase, the predetermined electrical command signal (illustrated in the first graph of FIG. 9B) is adapted until the estimated speed catches up with the reference speed as illustrated in the first graph of FIG. 9C, whereby the difference between the reference speed and the estimated speed becomes less than the predetermined threshold wd at time 0.6 s of the method. This implies that the motor speed is now close to the reference speed. At this point of method 900, the estimating of the parameter related to the magnetic flux of the permanent magnet rotor may start.

Until time 0.6 s as illustrated in FIGS. 9B and 9C, corresponding to the motor speed being close to the reference speed, the magnetic flux value used in the control law applied by the variable speed drive proceeding with method 900 was not varied, as illustrated by the dashed line at about 900 mWb illustrated in the fourth graph of FIG. 9B. In the fourth graph of FIG. 9B, one should note that the solid line corresponding to the "Permanent flux value" corresponds to the estimated parameter which will be recorded when the method 900 will be completed, and that such value (here at about 950 mWb) is determined at about 0.98 s into the method 900 as explained below.

From time 0.6 s, as illustrated in FIG. 9A, the permanent flux value, or magnetic flux value of the permanent magnet rotor, is updated in a step 2, and a new sequence of voltage or current based on the estimated permanent flux value is applied. This process is iterated by computing an error ErrFlux value based on motor data and measure data in the variable speed drive and being in % of a nominal flux value, the flux value being updated, and step 2 repeated until the ErrFlux passes below a threshold value ErrTh which is a predetermined threshold. This phase corresponds to a time between 0.6 s and about 0.98 s and is well illustrated on the second graph of FIG. 9C illustrating the iterative process leading to the error falling in this case below a threshold. At this point, the estimated magnetic flux value (or parameter related to the magnetic flux of the permanent magnet rotor) used for the control law is such that the motor behaves as expected, such estimated magnetic flux value or estimated parameter being recorded in the variable speed drive accordingly. If one would, at this point, start method 900 all over again, using as magnetic flux value the value corresponding to the recorded estimated parameter, the starting sequence would reach stability faster than illustrated on FIGS. 9A-C because the permanent flux value illustrated on the fourth graph of FIG. 9B as a solid line would, from time 0, match the estimated flux value illustrated in a dashed line. The motor control would thereby be improved by using in the control law a parameter related to the magnetic flux of the permanent magnet rotor experimentally determined by a method according to this disclosure.

The invention claimed is:

1. A method for controlling a synchronous motor using a variable speed drive, the motor comprising a permanent magnet rotor generating a magnetic flux, the method comprising:
   when the motor is at rest, applying a predefined electrical command signal to the motor;
   estimating a motor speed in response to the applying of the predefined electrical command signal;
   iteratively adapting a value of the predefined electrical command signal as a function of an updated motor speed estimation at least until reaching a desired estimated motor speed that indicates that the motor is operating in a stable manner;
   waiting from when the predefined electrical command signal is applied when the motor is still at rest until reaching the desired estimated motor speed;
   in response to reaching the desired estimated motor speed, estimating a parameter related to the magnetic flux of the permanent magnet rotor, wherein the parameter is the magnetic flux of the permanent magnet rotor;
   recording the estimated parameter; and
   taking the recorded estimated parameter into account for driving the synchronous motor.

2. The method according to claim 1, wherein the estimating of the motor speed comprises monitoring motor currents.

3. The method according to claim 1, wherein the predefined electrical command signal is a predefined voltage signal.

4. The method according to claim 1, wherein estimating the parameter related to the magnetic flux of the permanent magnet rotor results from adapting a value of the parameter iteratively.

5. The method according to claim 1, wherein the desired estimated motor speed is within a reference speed range or above a reference speed threshold.

6. The method according to claim 1, wherein reaching the desired motor speed comprises comparing an estimated motor speed to an expected motor speed.

7. The method according to claim 6, wherein the desired motor speed is reached when a difference between the estimated motor speed and the expected motor speed starts decreasing or is less than a speed difference threshold.

8. The method according to claim 1, wherein the estimated parameter is within a reference parameter range.

9. The method according to claim 1, wherein the predefined electrical command signal has a predefined amplitude and frequency profile.

10. The method according to claim 1, the method further comprising providing a magnetic flux state diagnostic based on a deviation of the estimated parameter from a predetermined range.

11. A non-transitory computer-readable storage medium comprising instructions which, when executed by a processor, cause the processor to carry out the method of claim 1.

12. A variable speed drive of a synchronous motor comprising a permanent magnet rotor, the variable speed drive comprising a processor and a memory, the processor being configured to operate according to the method of claim 1.

13. The method according to claim 4, wherein the recorded estimated parameter has the value adapted by iterations performed for adapting a value of the parameter, and the recorded estimated parameter is used as the estimated parameter for a next time the predefined electrical command signal is applied after the motor was again at rest.

* * * * *